United States Patent [19]
Rosen

[11] Patent Number: 6,007,036
[45] Date of Patent: Dec. 28, 1999

[54] STOWABLE SUPPORT APPARATUS

[75] Inventor: John B. Rosen, Eugene, Oreg.

[73] Assignee: Rosen Products LLC, Eugene, Oreg.

[21] Appl. No.: 08/936,027

[22] Filed: Sep. 23, 1997

[51] Int. Cl.$^6$ .................................................. E04G 3/00
[52] U.S. Cl. ................................. 248/286.1; 248/279.1; 224/281; 224/282; 297/217.3; 297/411.35; 297/411.33; 312/237
[58] Field of Search ............................... 248/314, 299.1, 248/298.1, 284.1, 286.1, 285.1, 278.1, 279.1, 281.11; 312/7.2, 237, 322; 297/217.1, 217.3, 411.3, 411.31, 411.32, 411.35, 411.37, 411.38, 411.33; 224/281, 282, 553, 554

[56] References Cited

U.S. PATENT DOCUMENTS

| | | | |
|---|---|---|---|
| D. 363,927 | 11/1995 | Rosen | D14/114 |
| D. 367,477 | 2/1996 | Rosen | D14/114 |
| 2,514,655 | 7/1950 | Luketa | 297/330 |
| 4,455,008 | 6/1984 | MacKew | 248/447.2 |
| 4,573,854 | 3/1986 | McFarland | 224/553 |
| 4,620,808 | 11/1986 | Kurtin et al. | 400/83 |
| 4,708,312 | 11/1987 | Rohr | 248/280.1 |
| 4,735,467 | 4/1988 | Wolters | 312/29 |
| 4,836,486 | 6/1989 | Vossoughi et al. | 248/281.1 |
| 4,982,996 | 1/1991 | Vottero-Fin et al. | 297/194 |
| 5,076,524 | 12/1991 | Reb et al. | 248/296 |
| 5,177,616 | 1/1993 | Riday | 358/254 |
| 5,179,447 | 1/1993 | Lain | 358/254 |
| 5,195,709 | 3/1993 | Yasushi | 248/280.1 |
| 5,271,590 | 12/1993 | Rosen | 248/222.1 |
| 5,311,302 | 5/1994 | Berry et al. | 348/14 |
| 5,360,150 | 11/1994 | Praz | 224/281 |
| 5,374,104 | 12/1994 | Moore et al. | 297/188.16 |
| 5,379,978 | 1/1995 | Patel et al. | 224/281 |
| 5,547,248 | 8/1996 | Marechal | 297/188.17 |
| 5,611,513 | 3/1997 | Rosen | 248/222.11 |
| 5,692,718 | 12/1997 | Bieck | 224/281 |

FOREIGN PATENT DOCUMENTS 0 368 609    7/1989    European Pat. Off. .

*Primary Examiner*—Derek J. Berger
*Assistant Examiner*—Gwendolyn Baxter
*Attorney, Agent, or Firm*—Kolisch, Hartwell, Dickinson, McCormack & Heuser

[57] ABSTRACT

A stowable support apparatus is disclosed and includes an elongate, horizontally oriented track with a slide mounted and reciprocally movable thereon. A support arm is pivotally coupled to the slide, and a mounting bracket that receives a display unit and includes a handle is pivotally coupled to the support arm. The apparatus further includes a lock mechanism that selectively secures the slide in a defined position on the track and includes a bias mechanism that urges the slide away from the lock mechanism. The apparatus, including a supported display unit, is selectively adjustable from a stowed position, in which the display unit is stored within a box-like housing on which the track is mounted, and a user-viewable position, in which the display unit is pivoted out of the housing and presented in an elevated viewing position.

21 Claims, 6 Drawing Sheets

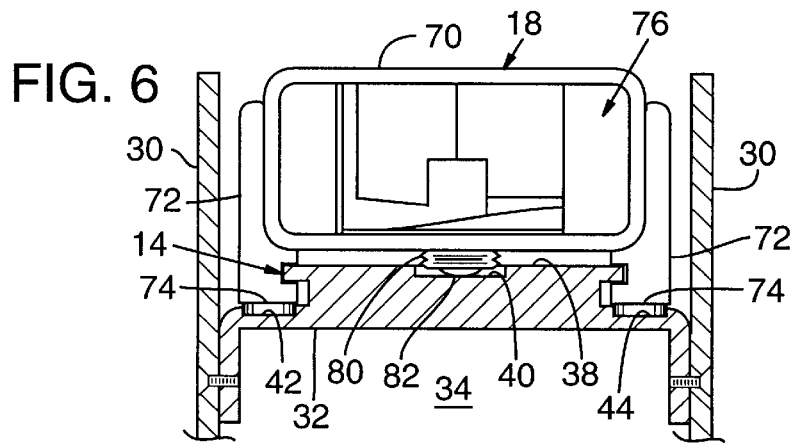
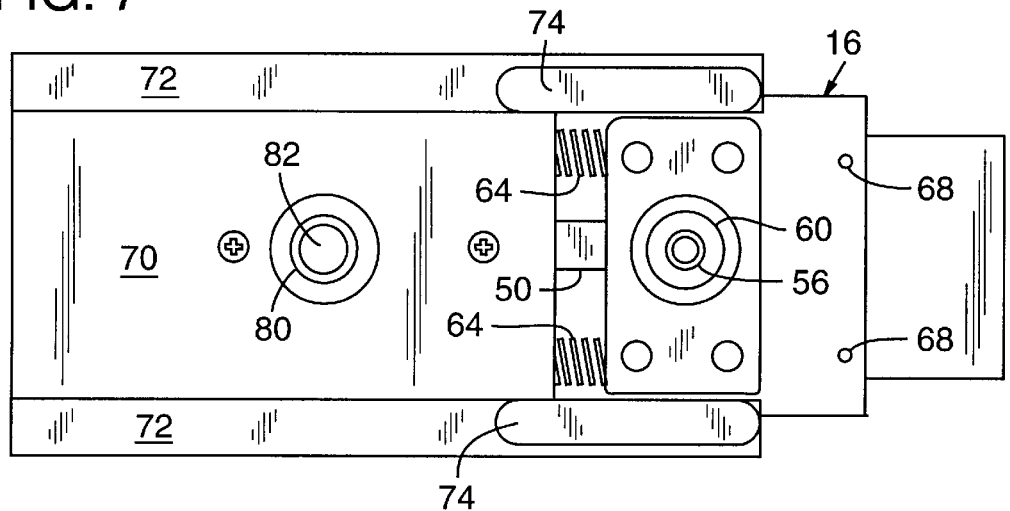
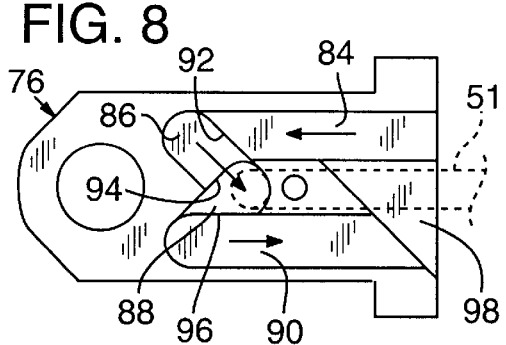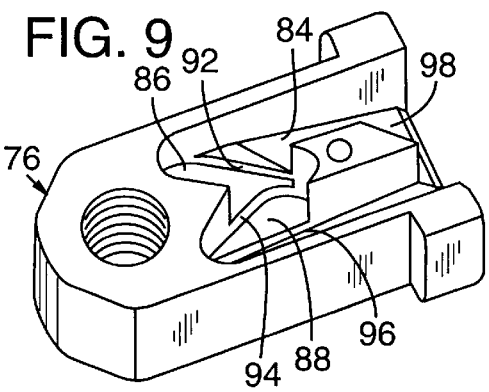

STOWABLE SUPPORT APPARATUS

FIELD OF THE INVENTION

The present invention relates generally to support structures for display units, and more particularly to a stowable apparatus for storing and supporting a display unit.

BACKGROUND AND SUMMARY OF THE INVENTION

In confined places such as aircraft and other vehicular passenger compartments, space is at a premium. Appliances such as flat-panel television and display monitors are important to many travelers, but must be provided with the capability of being stowed out of the way of the passengers and crew when not in use. Nonetheless, deployable/stowable appliances must be quickly and easily positionable by the user and should be as nearby as possible, preferably being built into the passenger's seat or an adjacent structure. Due to space constraints in such areas, however, efficient storage of the apparatus and its supported display unit is necessary. Because of the relatively low-slung seats that are typical on most commercial and private aircraft, unusual vertical space limitations further constrain the design of what will be referred to herein as a stowable support apparatus. The apparatus is used to support and position a display unit, which may include, for example, a television screen, a monitor for a computer or other interactive device, or other devices for displaying visual or audio-visual information to a viewer.

The utility of such an apparatus is especially recognized in environments such as airplanes, buses and other land vehicles, or in terminal areas. The apparatus provides the user with entertainment and/or allows the user to work. For instance, a television monitor may be utilized to display a movie or some other form of entertainment. Alternatively, the display unit may come in the form of a computer monitor operably connected to a computer to enable the user to work while traveling. Such an apparatus, because of its close proximity to the user's seat, must be stowable during ingress and egress so that it does not interfere with passenger movement. Moreover, after a passenger is seated, the apparatus should be accessible in an ergonomically advantageous way.

The user should also be able selectively to position the display unit for comfortable viewing angles. Because travelers and seating areas therefor differ dramatically in size and shape, the support apparatus must be adjustable to present the display unit at a user-selected viewing angle, regardless of the size or shape of the particular seat or user. Furthermore, even similarly sized individuals may have different preferred viewing angles. Therefore a stowable support apparatus should not only adjust between a stowed and a user-viewable position, but also should enable a user to adjust selectively the viewing orientation of the display unit to suit that user's particular needs or preferences.

Safety is also of utmost importance when such an apparatus is being used by a passenger when a vehicle is in transit. Sudden stops, starts, or changes in direction could cause the apparatus, including its display unit, to fly out of control and damage the unit or injure the intended user or nearby passengers. Therefore there is a need for a stowable support apparatus which is constrained from freely moving or otherwise adjusting when the vehicle or passenger undergoes sudden stops or movements. A competing, and equally important concern, however, is that the apparatus must collapse or yield if impacted by the user, such as during a collision or rapid change in direction or speed. If the device remains rigidly positioned when impacted, the user is prone to severe injury when he or she impacts this non-yielding structure. To satisfy both concerns, the apparatus should retract or otherwise pivot to a safe position when struck by a user or other object, yet resist changes in position solely on account of changes in the vehicle's speed or direction.

Although a number of stowable monitor supports are known in the prior art, such supports are unsatisfactory due to their failure to address and satisfy all of the concerns listed above.

With the above problems in mind, it is an object of the present invention to provide a stowable support apparatus that positions and supports a display unit.

Another object is to provide a stowable support apparatus that is adjustable from a stowed position, in which an attached display unit is housed in an out-of-the-way position, and a user-viewable position, in which the display unit is presented for viewing by the user.

It is another object to provide a stowable support apparatus that is adjustable by the user to multiple positions for satisfying ergonomic requirements.

Still another object of the invention is to provide a stowable support apparatus that may be easily pivoted out of the way in the event of an emergency.

The invention achieves these and other objects and advantages in the form of a stowable support apparatus that includes an elongate, and preferably horizontally oriented, track with a slide mounted and reciprocally movable thereon. A support arm is pivotally coupled to the slide, and a mounting bracket that receives a display unit and includes a handle is pivotally coupled to the support arm. The apparatus further includes a lock mechanism that selectively secures the slide in a defined position on the track and includes a bias mechanism that urges the slide away from the lock mechanisms. The apparatus, including a supported display unit, is selectively adjustable from a stowed position, in which the display unit is stored within a box-like housing on which the track is mounted, and a user-viewable position, in which the display unit is pivoted out of the housing and presented in an elevated viewing position.

These and other advantages and features of the invention will become more fully apparent as the detailed description below is read with reference to the accompanying drawings.

BRIEF DESCRIPTION OF THE DRAWINGS

FIG. 6 is an enlarged, cross-sectional view of the track and slide shown in FIG. 1, taken along line 6—6 in FIG. 1.

FIG. 7 is a bottom plan view of the slide and lock mechanism shown in FIG. 2.

FIG. 8 is a top plan view of the cam block of the slide shown in FIG. 5.

FIG. 9 is an isometric view of the cam block shown in FIG. 8.

DETAILED DESCRIPTION OF THE PREFERRED EMBODIMENTS

Figure 1:
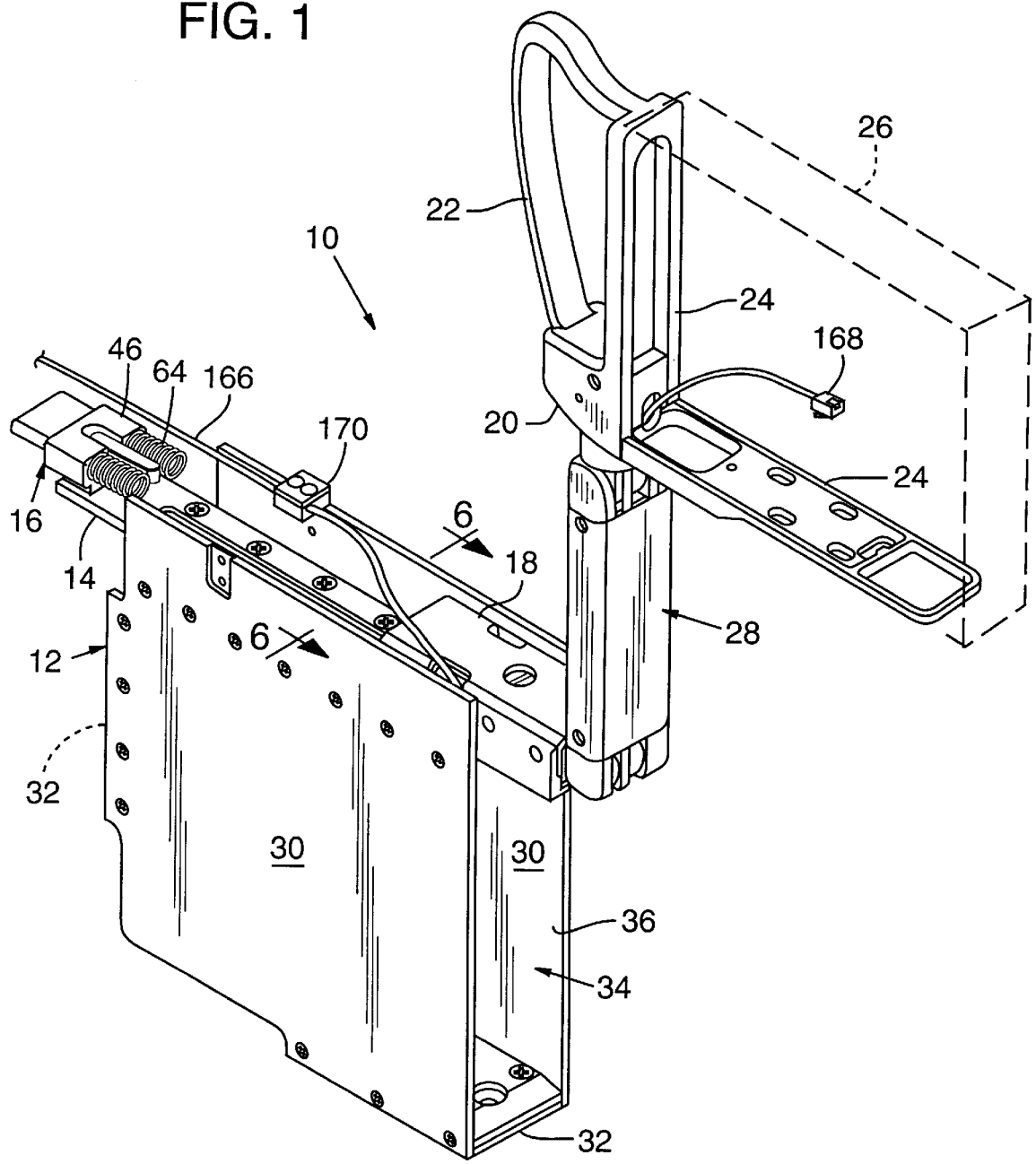
FIG. 1 is an isometric view showing a stowable support apparatus constructed according to a preferred embodiment of the invention and showing a display unit in dashed lines.

A stowable support apparatus constructed according to a preferred embodiment of the present invention is shown in FIGS. 1–4 and indicated generally at 10. Apparatus 10 includes a housing 12 and an elongate track 14. A lock mechanism 16 is mounted adjacent one end of track 14, and a slide 18 is mounted on track 14 and reciprocally moveable thereon. A mounting bracket 20 with a handle 22 provides a mounting surface 24 for a display unit 26 (shown in dashed lines in FIGS. 1 and 2) and is pivotally coupled to slide 18 by a support arm 28.

As illustrated in FIGS. 1–4, housing 12 includes a pair of generally rectangular side walls 30. End walls 32 extend between side walls 30 to connect and maintain side walls 30 in a spaced-apart relationship to each other, thereby defining a cavity 34 therebetween. Each side wall 30 is a solid surface, which protects display unit 26 when it is stored within housing 12, however it should be understood that side walls 30 may have a frame-like structure as well. As shown, end walls 32 extend between and at least partially along three of the sides of the pair of side walls 30, with the space between one set of corresponding sides being substantially open to define an opening 36 to permit display unit 26 to be inserted into and removed from cavity 34. As shown, housing 12 is shaped to closely conform to the shape of display unit 26.

Figure 2:
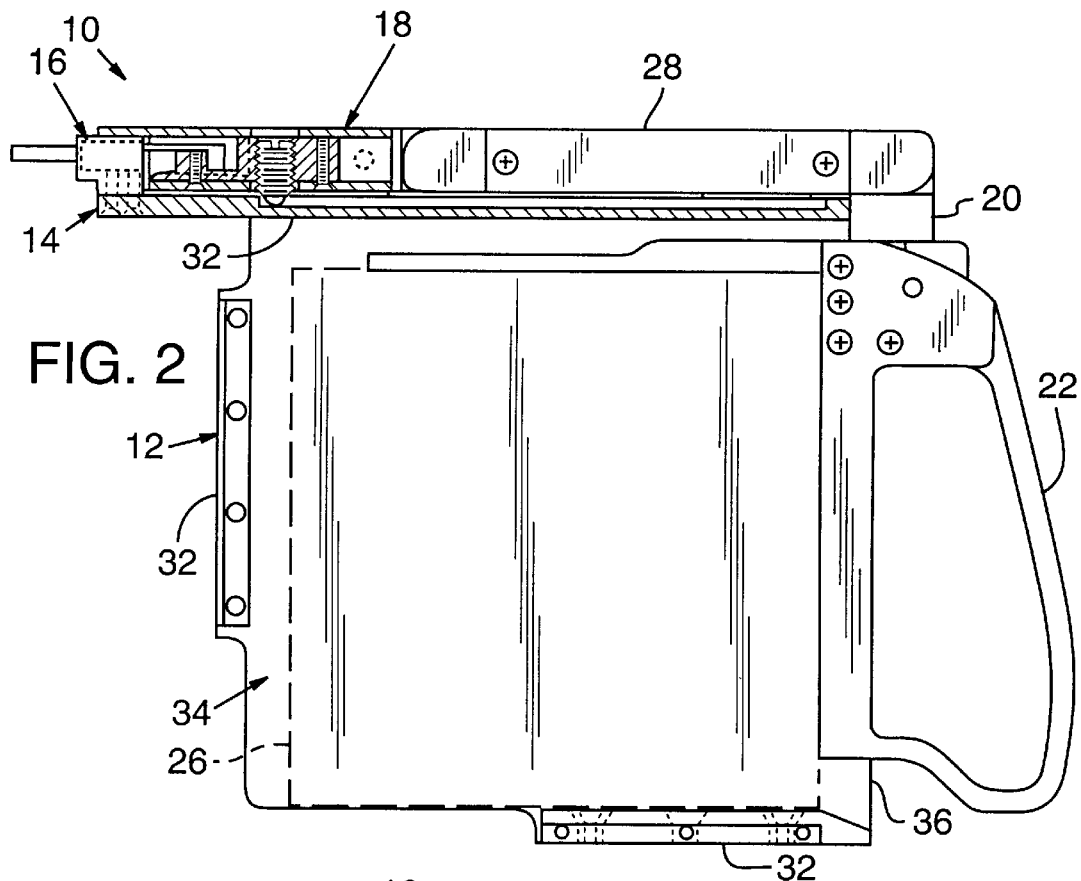
FIG. 2 is a side elevation view of the apparatus shown in FIG. 1 in its stowed position, with a portion of the housing broken away to show details of internal construction.
Figures 3, 4:
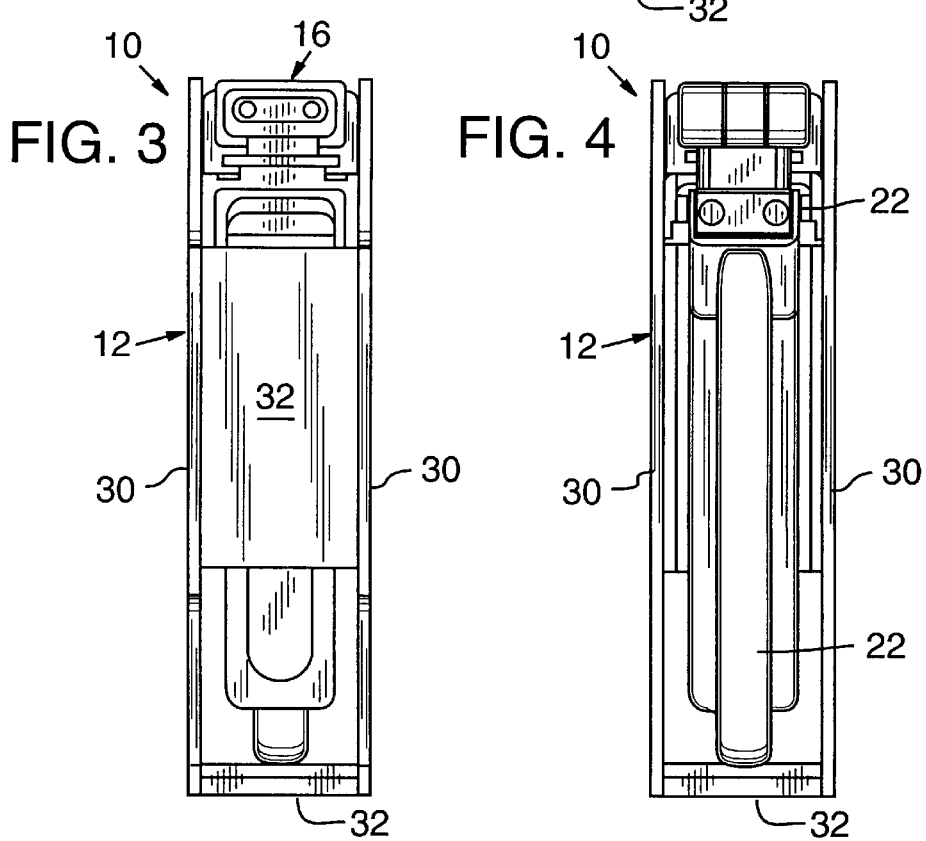
FIG. 3 is a rear elevation view of the apparatus shown in FIG. 2.
FIG. 4 is a front elevation view of the apparatus shown in FIG. 2.

Housing 12 is configured to be mounted within or adjacent a seat in the passenger compartment of an airplane, bus, etc. Preferably, housing 12 is installed adjacent or within the arm rest portion of a seat, with opening 36 extending away from the back-supporting portion of the seat. When display unit 26 is not being used, it may be stowed within cavity 34, as shown in FIG. 2. In its stowed position, display unit 26 is protected by housing 12 and stored in an out-of-the-way position where it will not inconvenience or obstruct users and other passengers and crew moving about the passenger area, getting into and out of their seats, and performing other activities. When the user desires to use display unit 26, the display is slidable out of cavity 34 and selectively adjustable to a desired viewing position, as discussed subsequently.

Figure 5:
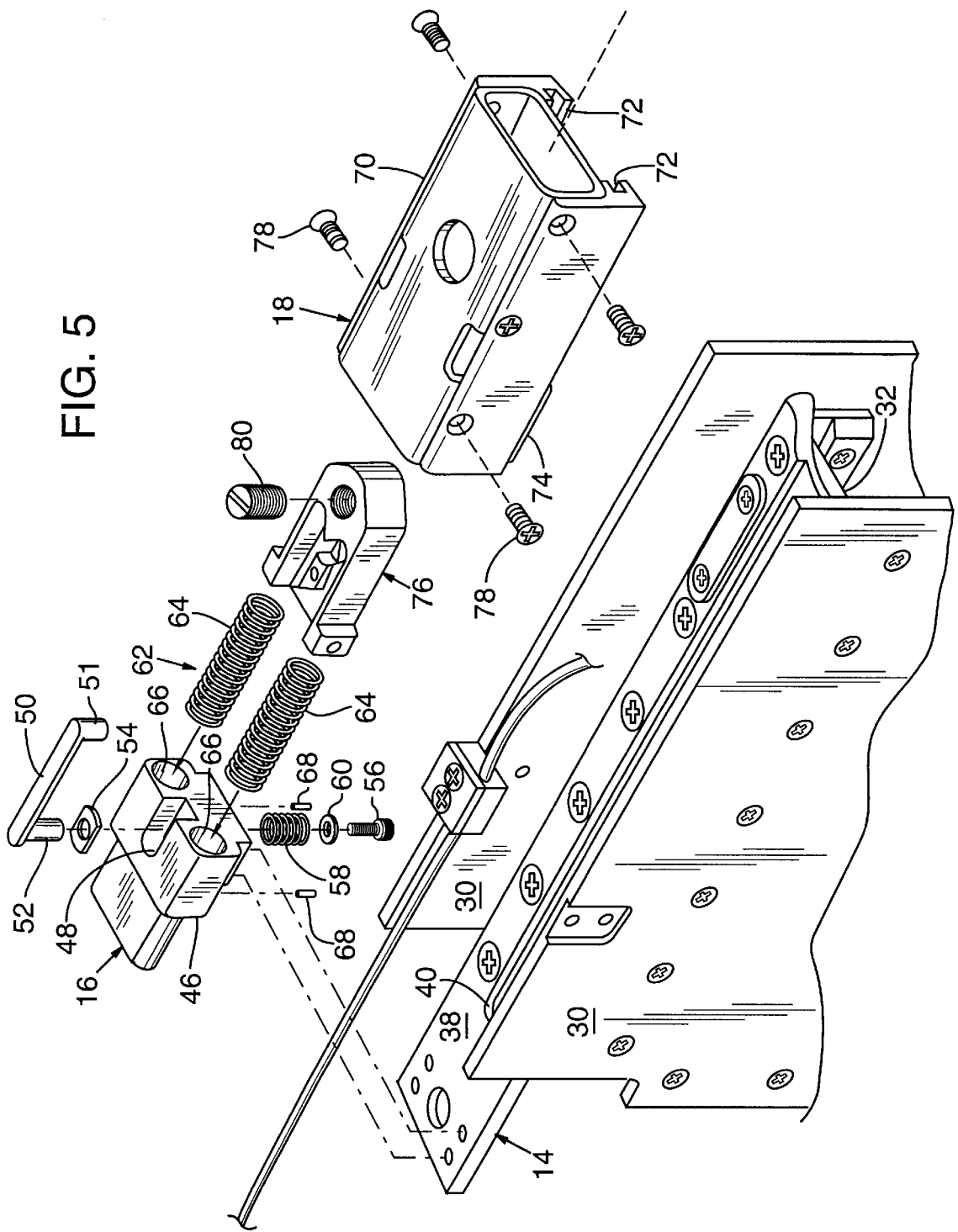
FIG. 5 is an isometric, partially exploded view of the track, lock mechanism and slide of the apparatus shown in FIG. 1.

Track 14 is shown in FIGS. 5 and 6 and extends along the outer surface of one of the housing's end walls 32. As shown, track 14 is recessed inwardly from and extends generally parallel to the top edge of each side wall 30 and extends along the length thereof. Track 14 includes an elongate planar member 38 with a first channel 40 extending along a substantial portion of the length thereof. Member 38 is supported above end wall 32 to give track 14 a generally T-shaped cross-sectional configuration, with second and third channels 42 and 44, respectively, defined in a longitudinally extending and laterally spaced relationship adjacent opposite sides of the base of member 38, as shown in FIG. 6. Preferably, channels 40–44, as well as the other moving parts described herein, are lubricated with a suitable lubricant, such as a teflon grease, to facilitate the smooth movement of slide 18 along track 14.

Lock mechanism 16 is mounted adjacent one end of track 14 and is configured to selectively engage slide 18 to retain the slide, as well as support arm 28, in a defined position with respect to track 14. Lock mechanism 16 is shown in FIGS. 5 and 7 and includes a base 46, which is secured on track 14 and, as shown in FIG. 5, is mounted on the region of track 14 that extends beyond the periphery of housing 12. Base 46 includes a recess 48 into which a pawl 50 is pivotally mounted and configured to selectively engage slide 18, as discussed below. Pawl 50 includes an engagement portion 51 and a mount 52, which is secured on base 46 by a locking bearing 54 and a fastener, namely screw 56. It should be understood that pawl 50 is secured on base 46, but is still pivotal from its mounted position in a plane extending generally parallel to track 14 within a range defined by the walls of recess 48. Furthermore, screw 56 is passed through a spring 58, as shown in FIG. 5, which enables pawl 50 to deflect slightly upward or downward from this horizontal plane and then be returned to this neutral plane. A washer 60 retains spring 58 between the head of screw 56 and pawl 50.

Lock mechanism 16 further includes a bias mechanism, which is generally indicated at 62 in FIG. 5 and which is configured to urge slide 18 away from lock mechanism 16. As shown, bias mechanism 62 includes a pair of springs 64, which are each partially received within a corresponding pair of sockets 66 in base 46 and retained therein by a pair of pins 68.

Slide 18 is shown in FIGS. 5–7. As shown, slide 18 is mounted on track 14 and is reciprocally movable thereon. Slide 18 includes a housing 70, with a pair of flange-like downwardly extending projections 72, that are best seen in FIGS. 6 and 7. Projections 72 engage opposite sides of the track's planar member 38 to secure slide 18 on the track. Each projection 72 further includes a first guide member 74 that extends downwardly from a corresponding one of projections 72 and is configured to be received and travel within the track's second or third channels 42 and 44, respectively. Preferably, channels 42 and 44 are open-ended, in that first guide members 74 may be inserted within the channels from one end of track 14, namely the end on which lock mechanism 16 is mounted, but cannot be removed from channels 42 and 44 from the other end of track 14. Therefore, once slide 18 is mounted on track 14 and lock mechanism 16 is subsequently secured on the track, slide 18 cannot be removed from track 14 without disassembling apparatus 10. Slide 18 is constrained from jamming or rocking as it reciprocates along track 14 because it engages track 14 at two spaced-apart regions along the long axis of the track. While a narrow slide, relative to the length of track 14, would be prone to rocking or catching as it is moved along tack 14, slide 18 is of a sufficient length that it simultaneously contacts track 14 from two spaced-apart regions along the long axis of track 14 to provide a smooth, steady motion along the track.

Slide 18 firer includes a cam block 76 that is secured to housing 70 by a pair of lateral screws 78 and a larger central screw 80, which are shown in FIG. 5. As shown, screw 80 includes a second guide member 82 that extends downwardly through housing 70 and is received and travels at least partially within first channel 40 to guide and stabilize the movement of slide 18 along track 14.

As shown in FIGS. 8 and 9, cam block 76 includes a plurality of interconnected cams or detents 84–90, which are configured to be engaged sequentially by pawl 50 as slide 18 is brought into and removed from engagement with lock mechanism 16. As shown in FIG. 8, cams 84–90 form a generally M-shaped configuration, with cams 84 and 90 extending generally parallel to the long axis of track 14, and cams 86 and 88 extending therebetween and generally orthogonal to each other. As shown in FIG. 9, cams 84–90 are oriented at differing heights with respect to each other, and as such define walls 92–96 that cooperate with cams 84–90 to create a one-way, sequential path through the cams, as indicated by arrows in FIG. 8. Block 76 further includes a forward surface 98, which is upwardly and laterally inclined, and as a result orients pawl 50 to be received by cam 84 regardless of the initial angular orientation of pawl 50 with respect to slide 18.

As slide 18 travels along track 14 in the direction of lock mechanism 16, cam block 76 engages and compresses springs 64 of bias mechanism 62. Engagement portion 51 of pawl 50 engages forward surface 98 of block 76, thereby causing pawl 50 to pivot horizontally so that portion 51 is aligned to be received into first cam 84. As slide 18 continues moving toward lock mechanism 16, the pawl's forward portion 51 passes through cam 84 and enters cam 86. Because portion 51 passes over wall 92, it cannot reenter or be removed from block 76 through cam 84. Instead, it is pushed to the portion of cam 86 distal forward surface 98. When slide 18 is released by the user, bias mechanism 62 urges slide 18 away from lock mechanism 16. As this occurs, portion 51 is guided by cam 86 over wall 94 and into cam 88, where it is received into its locked position, shown in dashed lines in FIG. 8. Once secured, slide 18 is maintained in a defined, stowed position with respect to track 14.

To release slide 18 from engagement with lock mechanism 16, slide 18 is once again urged toward lock mechanism 16. Because portion 51 passed over wall 94, it cannot reenter cam 86, and instead is guided along cam 88, over wall 96 and into the portion of cam 90 distal forward surface 98. Once the force being exerted by the user on slide 18 is removed, bias mechanism 62 once again urges slide 18 away from lock mechanism 16, thereby causing portion 51 to be withdrawn from cam block 76 through cam 90. Because lock mechanism 16 is selectively actuated by successive engagements with slide 18, lock mechanism 16 may also be referred to as a push-button mechanism. Furthermore, when apparatus 10 is installed in or adjacent a seat or the arm rest of a seat, handle 22 of mounting block 20 is most commonly the portion of apparatus 10 that a user grips to cause the actuation of lock mechanism 16.

Figure 10:
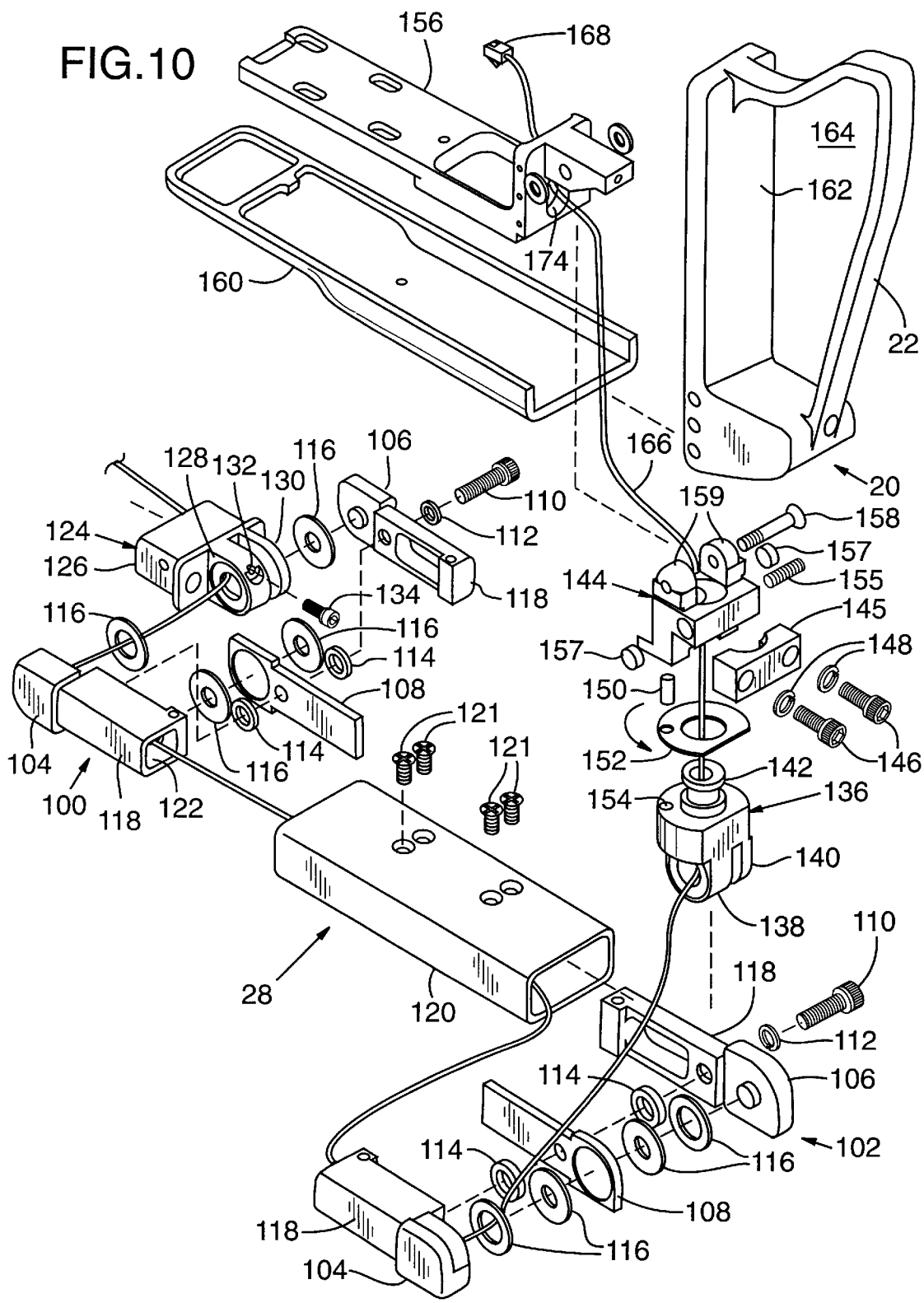
FIG. 10 is an exploded view of the support arm and mounting bracket of the apparatus shown in FIG. 1.

As discussed, slide 18 is pivotally coupled to a support arm 28, which in turn is pivotally coupled to mounting block 20. Support arm 28 is shown in FIG. 10 and includes first and second pivot assemblies 100 and 102. Each pivot assembly 100 and 102 includes first and second knuckles 104 and 106 that house a finger 108 and are joined by a fastener, namely screw 110 and lock washer 112. As shown, a plurality of spacers 114 and washers 116 may be inserted between finger 108 and knuckles 104 and 106. Each knuckle 104 and 106 includes an elongate stem portion 118 that is inserted into a body member 120 and retained therein by screws 121. As shown, body member 120 is hollow and has a generally rectangular cross-sectional configuration sized to receive and establish communication between stem portions 118 of first knuckles 104 of pivot assemblies 100 and 102. As shown, each first knuckle 104 includes a central passage 122 through which the display unit's power and/or communication cord 166 is threaded and protected from being cut or otherwise damaged.

Pivot assembly 100 is coupled to a slide pivot 124 to enable slide 18 and support arm 28 to pivot with respect to each other. Slide pivot 124 includes a base 126, which is inserted into the end of slide 18 distal lock mechanism 16, and a pair of teeth 128 and 130 that are respectively coupled between first knuckle 104, finger 108 and second knuckle 106. Slide pivot 124 further includes an aperture 132 through which a set screw 134 is inserted and used to adjust the parallel of support arm 28.

Pivot assembly 102 is coupled to mounting bracket 20, and specifically to a display pivot 136, to enable support arm 28 and mounting bracket 20 to pivot with respect to each other in the same plane as support arm 28 and slide 18. In fact, support arm 28 and slide 18 preferably enable relative movement of display unit 26 in his plane only. Thus, the pivot axes of each pivot assembly 100 and 102 and either slide pivot 124 or display pivot 136 are parallel and spaced-apart from each other and are orthogonal to the plane. Display pivot 136 is similar in configuration to slide pivot 124, and it includes a pair of teeth 138 and 140 that are respectively spaced between first knuckle 104, finger 108 and second knuckle 106 of pivot assembly 102. Unlike slide pivot 124, however, display pivot 136 includes a spindle 142 distal teeth 138 and 140 that enables rotational movement of display unit 26 about an axis transverse to the pivot axes of pivot assemblies 100 and 102.

In addition to display pivot 136, mounting bracket 20 further includes a tilt assembly 144 that is retained on spindle 142 by a clamp 145, which is shaped to conform to the configuration of spindle 142 and which is coupled to assembly 144 by a pair of screws 146 and lock washers 148. A dowel pin 150 is inserted, usually press fit, through a rotational washer 152 and partially into an aperture 154 in display pivot 136 to limit the rotational path of display unit 26 with respect to support arm 28. The end of pin 150 that is not inserted into pivot 136 is received within an arcuate cavity (not shown) in tilt assembly 144. As shown, mounting bracket 20 (and display unit 26) are able to rotate approximately 900 in the direction indicated with an arrow in FIG. 10. It should be understood that pin 150 and aperture 154 could be located in a similar position on the opposite side of tilt assembly 144 to enable rotation in the opposite direction. Because of this selective range of rotation, apparatus 10 can be configured to rotate out of the previously described pivot plane in a specified direction. Therefore, it is possible to design what may be referred to as right-hand units and left-hand units, depending on the direction in which the display unit is able to be rotated out of the pivot plane.

Furthermore, it is intended to be within the scope of the present invention that mounting bracket 20 could not include a dowel pin, thereby enabling a full 360° of rotational motion. For most applications, however, it is preferable to limit the rotational range of mounting bracket 20 for safety reasons. If mounting bracket 20 (and display unit 26) are able to rotate within a full 360°, or even a 180° range, a sudden blow or other contact by a user could cause the bracket and display unit to spin about spindle 142 and strike the user, an adjacent passenger or a nearby object. This would be especially likely if a pair of the previously described apparatus, namely a left-hand and a right-hand apparatus are installed within the same or nearby armrests and intended for use by passengers sitting next to each other.

Mounting bracket 20 also includes a base 156 that is coupled to the end of tilt assembly 144 distal display pivot 136. Base 156 provides a mounting surface 24 on which display unit 26 is mounted. Furthermore, base 156 is pivotally connected to tilt assembly 144 by a screw 158 that is passed through a pair of ears 159 extending on either side of a portion of base 156. This enables base 156 to pivot a limited degree about an axis that is transverse to both the previously discussed pivot axes of support arm 28 as well as the axis of rotation of mounting bracket 20 about spindle 142. This added degree of adjustment further enables apparatus 10 to selectively adjust to the particular preferred viewing angles of any given user. A pair of locking brakes 157 are mounted on opposing side walls of tilt assembly 144 to control the force a user must exert to cause base 156 to tilt with respect to tilt assembly 144. As shown, a set screw 155 extends through tilt assembly 144 to adjust the portion of one of locking brakes 157, thereby controlling the outward force or friction on coverplate 162.

Cover plates 160 and 162 are secured to base 156 with screws or other suitable fasteners (not shown) to protect display unit 26 when it is mounted on base 156 and prevent its unwanted removal from apparatus 10. Base 156 and plate 162 engage and support adjacent sides of display unit 26 to provide additional support and stability to the display. As shown, plate 162 includes a handle 22 configured to be gripped by the user to adjust and position apparatus 10. Preferably, handle 22 includes a removed region, such as aperture 164 through which at least a portion of a user's hand can be passed so that the user can establish a secure, firm grip on handle 22.

Throughout FIG. 10, cord 166 is threaded through support arm 28 and mounting bracket 22. Cord 166 establishes communication between display unit 26 and a power source and/or a source of data, information, etc. via plug 168, which is inserted into display unit 26. By referring briefly back to FIG. 1, one can see that cord 166 is supported by a retaining clip 170 prior to its entry into support arm 28. Cord 166 is then passed through one of a pair of lateral apertures 172 in slide 18, through first knuckles 104 on pivot assemblies 100 and 102, which define a protective conduit for cord 166 through support arm 28, through central apertures in spindle 142 and tilt assembly 144, and finally through an exit port 174 in base 156 of mounting bracket 20. Threaded through slide 18, support arm 28 and mounting bracket 20, as described above, cord 166 is supported and positioned for connection to display unit 26, while at the same time being maintained free from interference with the operation and adjustment of apparatus 10, and specifically the mutually engaging portions of slide 18 and lock mechanism 16, as well as the pivotal and rotational adjustments of support arm 28 and mounting bracket 20.

Once installed in an operative position with a display unit mounted thereon and initially positioned in its stowed position, shown in FIG. 2, apparatus 10 is ready to be used by a user. First, lock mechanism 16 is actuated by urging slide 18 toward lock mechanism 16 to actuate the lock mechanism and release pawl 51 from its locked position, which is shown in dashed lines in FIG. 8. Because handle 22 is generally the prominent portion of apparatus 10 that is readily accessible to the user when apparatus 10 is installed, the user should simply urge handle 22 in the direction of lock mechanism 16 to actuate the lock mechanism and release slide 18. If handle 22 is subsequently released by the user, bias mechanism 62 urges slide 18 away from lock mechanism 16 approximately to a position shown in FIG. 11. As shown, display unit 26 is partially removed from housing 12 as slide 18 travels along track 14 away from lock mechanism 16.

Figure 12:
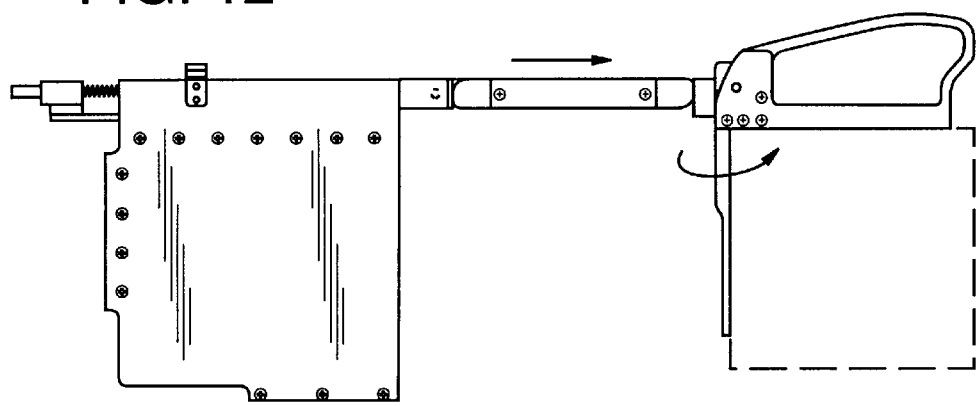
FIG. 12 is a side elevation view of the apparatus shown in FIG. 11 in an intermediate position, with the display unit fully removed from the housing and the handle pivoted to a horizontal position.

Display unit 26 is next drawn fully out of housing 12, preferably by the user grasping handle 22 and pulling the handle along the long axis of track 14 in a direction away from lock mechanism 16. Once slide 18 reaches the end of its slidable path along track 14, slide 18 is prevented from moving further away from lock mechanism 16 and the force exerted by the user causes handle 22 to pivot to a horizontal position, as shown in FIG. 12. In this position, display unit 26 is extended in its furthest position away from the user.

It should be understood that apparatus 10 may include a variety of stops for preventing slide 18 from sliding off of the end of track 14 distal lock mechanism 16. One suitable way, discussed previously, is for second and third channels 42 and 44 to be closed-ended distal lock mechanism 16, thereby stopping the movement of first guides 74, once they contact this closed end region.

Figure 13:
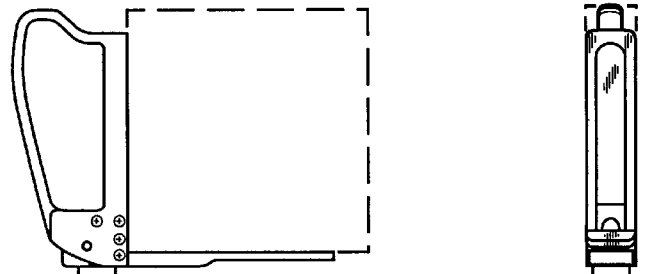
FIG. 13 is a side elevation view of the apparatus shown in FIG. 12 with the support arm pivoted to a vertical position.
Figure 14:
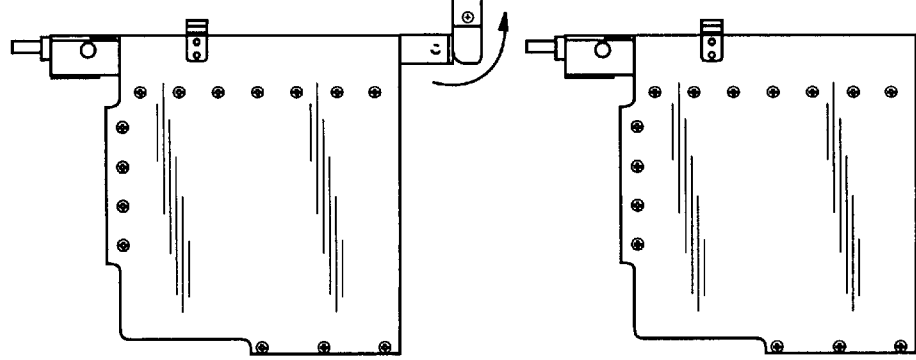
FIG. 14 is a side elevation view of the apparatus shown in FIG. 13 with the display unit rotated to a user-viewable position.

Next, the user draws display unit 26 upwardly and toward the user. This motion causes support arm 28 to pivot at is connection to slide 18 to a generally vertical position, which is shown in FIG. 13. In this position, display unit 26 is at its user-viewable height, but is oriented to face laterally away from the user. To adjust display unit 26 to a user-viewable position, it is rotated to the position shown in FIG. 14. To return apparatus 10 to its stowed position, the above-recited process is repeated in reverse order. Although the above-process has been generally described with respect to a user seated in a seat with apparatus 10 installed in the seat's arm rest with opening 36 oriented away from the user, it should be understood that apparatus 10 may be installed in other orientations with respect to the user, depending on the space requirements of a particular seating arrangement. For example, apparatus 10 may be installed within a wall or other structure and oriented so that opening 36 is at right angles to the user.

Because display unit 26, and specifically mounting bracket 20 on which the display unit is mounted, is rotational out of the pivot plane, it is selectively adjustable within this rotational range to suit the preferred viewing angle of a particular user. Similarly, if the user desires display unit 26 to be angled slightly, or even steeply, upward from the position shown in FIG. 14, then support arm 28 can be pivoted from vertical position to impart this angled orientation to the display unit. It should be further understood that all positional adjustments to apparatus 10 are preferably actuated by the user grasping handle 22. Handle 22 includes a user-gripable region designed to enable the user to firmly and securely grasp the handle. Furthermore, by adjusting apparatus 10 using handle 22, the user will not damage or get dirt and oil on display unit 26 and will not put stress on the display unit or its connection to mounting bracket 20.

As discussed previously, it is important that apparatus 10 is safe to use and operate, even when the vehicle on which it is mounted undergoes a sudden change in direction or speed, or when the apparatus is suddenly struck by a user, another passenger, object, etc. Therefore, each of the above-described pivotal and rotational connections should have sufficient frictional or other resistance that they will not freely adjust if the vehicle on which apparatus 10 is installed suddenly changes direction or speed. This eliminates the danger of a sudden start, stop or turn causing apparatus 10 to swing out of control and strike a passenger or impact another object.

Figure 11:
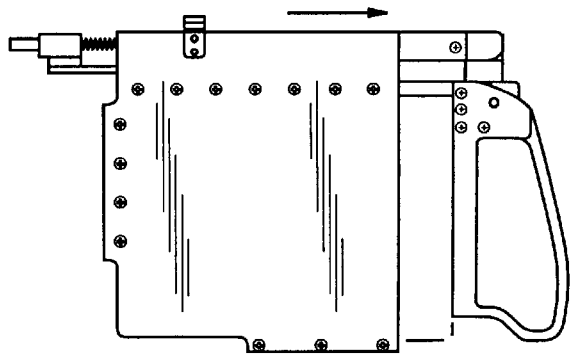
FIG. 11 is a side elevation view of the apparatus shown in FIG. 2, with the slide uncoupled from the lock mechanism and urged away from the lock mechanism to partially remove the display unit from the housing.

When apparatus 10 is struck by a passenger or another object, it is designed to automatically adjust to a safe, partially stowed position. Specifically, because mounting bracket 20 preferably only enables rotational motion out of the pivot plane of support arm 28 within a range of approximately 90°, if the user is thrown forward into mounting bracket 20 or display unit 26, it will rotate from the user-viewable position shown in FIG. 14 to the position shown in FIG. 13. It the user or other object continues to impact or otherwise put force on apparatus 10, support arm 28 will pivot from its position shown in FIG. 13 to a generally horizontal position shown in FIG. 12. Furthermore, mounting bracket 20 will collapse from its horizontal position shown in FIG. 12 to a generally vertical position, such as is shown in FIG. 11.

While the present invention has been shown and described with reference to the foregoing preferred embodiment, it is to be understood by those of skill in the art that other changes in form and detail may be made therein without departing from the spirit and scope of the invention as defined in the following claims.

I claim:

1. A support apparatus for supporting a display unit, comprising:
   a horizontally oriented track;
   a slide mounted on the track and reciprocally movable thereon;
   a mounting bracket pivotally coupled to the slide for attachment to the display unit, wherein the mounting bracket includes a handle with a user-grippable region; and
   a lock mechanism including a pawl that selectively engages the slide to maintain the slide in a defined position on the track.

2. The apparatus of claim 1, wherein the user-grippable region defines a removed region that facilitates a user grasping and adjusting the apparatus.

3. The apparatus of claim 2, wherein the removed region includes an aperture through which at least a portion of the user's hand can extend.

4. The apparatus of claim 1, wherein the mounting bracket is pivotal and rotatable with respect to the slide for enabling the display unit to be selectively adjusted to allow relative positioning for improved viewing by the user.

5. The apparatus of claim 1, wherein the mounting bracket is configured for engagement and support of the display unit on more than one side.

6. The apparatus of claim 1, wherein the lock mechanism is actuated by a user urging the handle in the direction of the lock mechanism.

7. The apparatus of claim 1, wherein the lock mechanism includes a bias mechanism that urges the slide away from the lock mechanism.

8. The apparatus of claim 7, wherein the bias mechanism includes at least one coil spring mounted between the lock mechanism and the slide.

9. The apparatus of claim 1, wherein the slide includes a plurality of detents that are sequentially engaged by the pawl to selectively couple and release the slide and the lock mechanism.

10. The apparatus of claim 1, wherein the apparatus further includes a housing that defines a cavity for stowing the display unit when not in use, the housing having an end wall that includes the track, and the cavity having a vertically oriented opening for insertion and removal of the display unit from the cavity.

11. The apparatus of claim 10, wherein the lock mechanism includes a bias mechanism configured for urging the display unit at least partially out of the cavity when the lock mechanism releases the slide.

12. A support apparatus for supporting a display unit, comprising:
    a horizontally oriented track;
    a slide mounted on the track and reciprocally movable thereon;
    a mounting bracket pivotally coupled to the slide for attachment to the display unit, wherein the mounting bracket includes a handle with a user-grippable region;
    a lock mechanism that selectively engages the slide to maintain the slide in a defined position on the track; and
    wherein the slide includes at least two regions that engage the track and are longitudinally spaced-apart from each other along the length of the track in the direction of the slide's movement along the track to prevent rocking or catching of the slide as it reciprocates along the track.

13. A stowable support apparatus adapted for use with a housing having an end wall and opposed side walls extending transverse to the end wall to define a cavity, the apparatus comprising:
    an elongate track extending generally along the length of the end wall;
    a slide mounted on the track and reciprocally movable thereupon, wherein the slide moves in a first plane that extends along the length of the track and generally parallel to the side walls;
    a support arm having first and second ends, the first end pivotally mounted on the slide to enable the arm to be selectively pivoted within the first plane about a first pivot axis; and
    a display unit pivotally coupled to the second end of the support arm and pivotal within the first plane about a second pivot axis parallel to the first pivot axis;
    wherein the slide includes at least two regions that engage the track and are longitudinally spaced-apart from each other along the length of the track in the direction of the slide's movement along the track to prevent rocking or catching of the slide as the slide reciprocates along the track.

14. A support apparatus for supporting a display unit, comprising:
    a track;
    a slide mounted on the track and reciprocally movable thereon;
    a mounting bracket coupled to the slide for attachment to the display unit; and
    a lock mechanism including a pawl that selectively engages the slide to maintain the slide in a defined position on the track.

15. A support apparatus for supporting a display unit, comprising:
    a horizontally oriented track;
    a slide mounted on the track and reciprocally movable thereon;
    a mounting bracket for attachment to the display unit is mounted, wherein the mounting bracket includes a handle with a user-grippable region;
    a support arm having first and second ends, the first end being pivotally coupled to the slide and the second end being pivotally coupled to the mounting bracket;
    a lock mechanism that selectively engages the slide to maintain the slide in a defined position on the track; and wherein the slide and the support arm are configured to enable relative movement of the display unit in one plane only and rotatable out of the plane in one direction only.

16. A stowable support apparatus adapted for use with a housing having an end wall and opposed side walls extending transverse to the end wall to define a cavity, the apparatus comprising:

an elongate track extending generally along the length of the end wall;

a slide mounted on the track and reciprocally movable thereupon, wherein the slide moves in a first plane that extends along the length of the track and generally parallel to the side walls;

a support arm having first and second ends, the first end pivotally mounted on the slide to enable the arm to be selectively pivoted within the first plane about a first pivot axis;

a display unit pivotally coupled to the second end of the support arm and pivotal within the first plane about a second pivot axis parallel to the first pivot axis;

a mounting bracket interconnecting the second end of the support arm and the display unit to enable pivotal and rotational movement of the display unit with respect to the support arm; and wherein the slide and the support arm enable relative movement of the display unit in the first plane only, and wherein the mounting bracket is pivotal within the first plane and rotatable transverse to the first plane, and further wherein the mounting bracket is rotatable out of the first plane in one direction only.

17. The apparatus of claim 16, wherein the mounting bracket is rotatable about an axis orthogonal to the first and the second pivot axes and parallel to the first plane for enabling the relative radial position of the display unit to be adjusted for improved viewing by the user.

18. A stowable support apparatus adapted for use with a housing having an end wall and opposed side walls extending transverse to the end wall to define a cavity, the apparatus comprising:

an elongate track extending generally along the length of the end wall;

a slide mounted on the track and reciprocally movable thereupon, wherein the slide moves in a first plane that extends along the length of the track and generally parallel to the side walls;

a support arm having first and second ends, the first end pivotally mounted on the slide to enable the arm to be selectively pivoted within the first plane about a first pivot axis;

a display unit pivotally coupled to the second end of the support arm and pivotal within the first plane about a second pivot axis parallel to the first pivot axis; and a mounting bracket interconnecting the second end of the support arm and the display unit to enable pivot and rotational movement of the display unit with respect to the support arm, the mounting bracket including a handle configured to be grasped by a user to adjust the position of the display unit.

19. The apparatus of claim 18, wherein the handle defines an aperture through which at least a portion of a user's hand can extend to enable the handle to be gripped more firmly for adjustment and positioning of the apparatus.

20. The apparatus of claim 18, wherein the apparatus includes a lock mechanism that selectively engages the slide to retain the slide in a defined position on the track, and further wherein the lock mechanism is actuated by a user urging the handle in the direction of the lock mechanism.

21. A support apparatus and a display unit, comprising:

a track;

a slide mounted on the track and reciprocally movable thereon;

a display unit;

a mounting bracket pivotally coupled to the slide and on which the display unit is mounted; and a lock mechanism including a pawl that selectively engages the slide to maintain the slide in a defined position on the track.

* * * * *

UNITED STATES PATENT AND TRADEMARK OFFICE
CERTIFICATE OF CORRECTION

PATENT NO. : 6,007,036
DATED : December 28, 1999
INVENTOR(S) : John B. Rosen, James C. Dezotell and Jeffrey S. Chapman It is certified that error appears in the above-identified patent and that said Letters Patent is hereby corrected as shown below:

Title Page,
The inventor should be changed from "John B. Rosen" to read --John B. Rosen, James C. Dezotell and Jeffrey S. Chapman--.

Signed and Sealed this

Third Day of July, 2001

*Attest:*

*Attesting Officer*

NICHOLAS P. GODICI
*Acting Director of the United States Patent and Trademark Office*